July 21, 1964    F. E. BENJAMIN ETAL    3,141,619
AERATING DEVICE
Filed Nov. 16, 1961
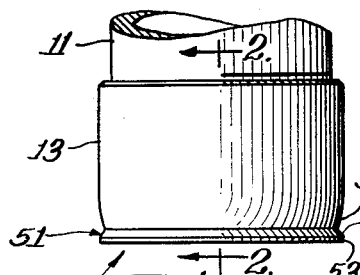
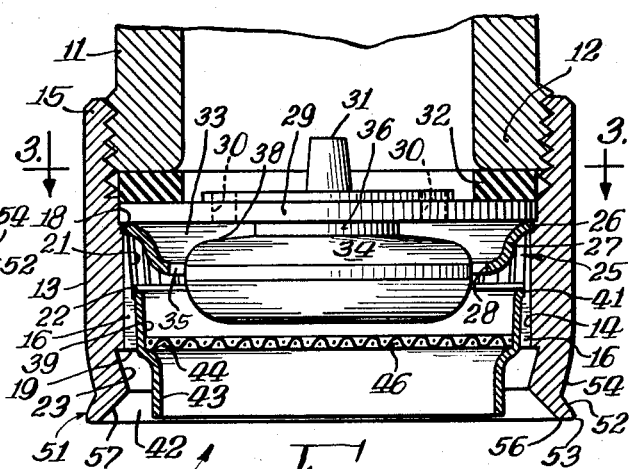
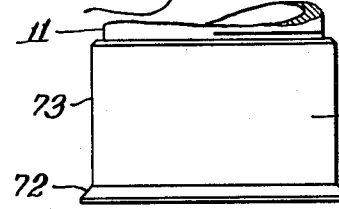
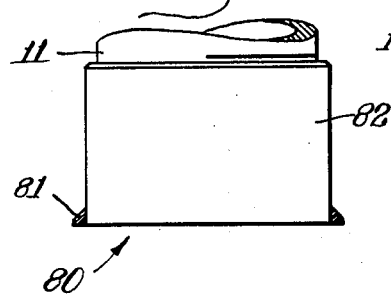
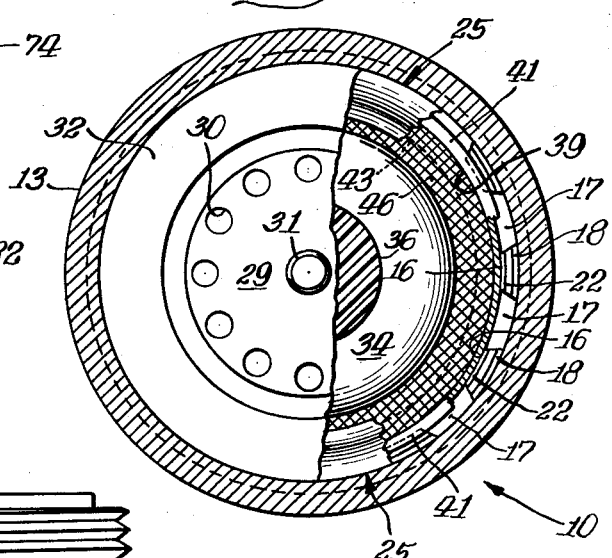
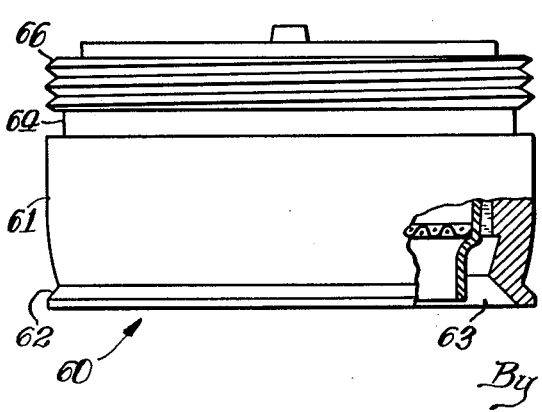
INVENTORS.
Frank E. Benjamin,
John Earnshaw,
By Davis, Lindsey, Hibben & Noyes Attys.

United States Patent Office 3,141,619
Patented July 21, 1964

3,141,619
AERATING DEVICE
Frank E. Benjamin, Chicago Heights, and John Earnshaw, Chicago, Ill., assignors to Wrightway Engineering Co., Chicago, Ill., a corporation of Illinois
Filed Nov. 16, 1961, Ser. No. 152,749
3 Claims. (Cl. 239—424)

This invention relates to improvements in aerating devices of the type adapted to be connected to water faucets and the like.

Aerating devices for mixing air and water to produce a soft, bubbly, coherent stream are now widely known and used on faucets and other water conduits. Aerating devices thus far developed, such as is disclosed in U.S. Patent No. 2,761,662, generally comprise a tubular casing having lateral air inlet ports or slots, means for mixing air and water within the casing including an apertured disk providing jets of water within the casing, a breakup plug against which the jets impinge, and means at the lower or outlet end of the casing for coalescing the water and entrained air into an aerated stream. While aerators utilizing such a construction have proved satisfactory for their intended purpose, the provision of the lateral air inlet ports or slots in the side wall of the aerator casing has occasionally caused objections to be raised on sanitary grounds in that such slots afford ledges for the accumulation of dirt or debris which conceivably could contaminate the effluent stream from the aerator.

Another type of aerator dispenses with lateral air inlet ports and instead provides a bottom air inlet concentric with the effluent aerated stream. However, even the bottom air inlet type aerator has been subject to criticism in some quarters since it is suggested that in humid weather droplets of water may condense on the outside of the aerator casing and become contaminated with foreign matter, the contaminated droplets then gravitating downwardly to the lower end of the aerator in the vicinity of the bottom air inlet. Thus, the possibility is conceived that the aerated stream of water discharging through the outlet may also become contaminated if the contaminated droplets are sucked or drawn into the bottom air inlet. Obviously, the foregoing objection could also be raised in connection with an aerator having lateral air inlet ports.

Accordingly, it is a general object of the present invention to provide a novel and improved aerating device having highly effective sanitation characteristics.

A more particular object is to provide a novel and improved aerating device which precludes the entry of foreign material into the air inlet of the aerator.

A specific object is to provide an improved aerating device having a bottom opening air-intake structure in which deflection means is provided adjacent the air inlet for preventing entry of contaminated liquid droplets or the like into the air inlet.

Other objects and advantages of the invention will become evident from the subsequent detailed description which follows, and accompanying drawings wherein:

FIG. 1 is a fragmentary side elevational view of a faucet outlet having mounted thereon an aerating device comprising one specific embodiment of the invention;

FIG. 2 is an enlarged longitudinal sectional view taken along the line 2—2 of FIG. 1;

FIG. 3 is a transverse sectional view along the lines 3—3 of FIG. 2, with portions broken away to reveal the interior structure;

FIG. 4 is an enlarged side elevational view of a modified form of the invention;

FIG. 5 is a view similar to FIG. 1, showing still another modification of the invention; and FIG. 6 is a view similar to FIGS. 1 and 5, showing a further modification of the invention.

In FIGS. 1 to 3 of the drawing, an aerating device embodying the features of the present invention is illustrated and designated generally at 10. The aerator construction, except for the improvements comprising the present invention, is generally similar to that shown in Frank E. Benjamin application Serial No. 302,046, filed August 14, 1963. As shown in the drawing, the aerating device 10 is mounted on the end of a fluid supply conduit or faucet 11 having an externally threaded end portion 12, the faucet 11 being illustrated fragmentarily in FIGS. 1 and 2. While not forming a part of the present invention, the internal structure of the aerator 10 will be described as exemplary of one form of construction with which the present invention is adapted for use.

Thus, the aerating device 10 comprises a tubular casing 13 having an internal cylindrical side wall 14 and an internally threaded upper or inlet end portion 15 that is adapted to be screwed onto the externally threaded end portion 12 of the faucet 11. The inner wall 14 is formed with a plurality of vertically extending circumferentially spaced ribs or splines 16 which provide a plurality of vertically extending grooves or openings 17 (FIG. 3) therebetween. Each rib 16 has a flat upper end 18 (FIG. 2) spaced axially below the inlet end of the casing 13 and a lower end 19 spaced axially above the outlet end of the casing 13. The innermost edge of each rib 16 tapers downwardly and inwardly as at 21 (FIG. 2) and is formed with a narrow shoulder or ledge 22. Below the ribs 16, the inner wall 14 tapers inwardly, as at 23, and then flares outwardly, as at 57, for a purpose to be described more fully hereinafter.

The ribs 16 provide a mounting and support for mixing means within the interior of the casing 13. Thus, the circumferentially spaced upper ends 18 of the ribs 16 provide a plurality of shoulders which support an annular dished baffle 25 having an upper end 26 of a diameter substantially equal to that of the internal diameter 14 of the casing 13. The baffle 25 will thus be maintained in tight frictional engagement with the casing when seated on the upper ends 18 of the ribs 16. The baffle 25 includes a depending skirt portion 27 and a lower radially in-turned lip portion 28.

A disk 29 having a plurality of annularly arranged perforations or holes 30 is seated on the outwardly flared rim or upper end 26 of the baffle 25, the diameter of the disk 29 being somewhat less than the internal diameter 14 of the casing 13 to permit ready removal thereof. A vertically upwardly extending post 31 is provided on the disk 29 to facilitate removal thereof from the casing 13. In order to insure a fluid-tight seal between the upper surface of the disk 29 and the end of the faucet 11, an annular gasket 32 of rubber or the like is interposed therebetween.

Water under pressure in the faucet 11 is thus imposed against the upper surface of the disk 29 and a flow thereof is obtained through the openings 30 to provide a multiplicity of substantially independent or discrete jets which are directed vertically downwardly into an internal mixing chamber or zone 33 within the aerator 10.

Immediately below the disk 29 and depending centrally from the lower side thereof is a break-up or splash plug 34 having a generally oblate spheroidal shape and a diameter greater than the diameter of the ring of openings 30 in the disk 29 but less than the internal diameter of the baffle 25. An annular space or orifice 35 is thus defined between the outer diameter of the plug 34 and the internal diameter of the baffle lip portion 28. The plug 34, in this instance, is formed integrally with the disk 29 and is connected thereto by a restricted neck portion 36.

The fine jets of water discharging from the openings 30 entrain air in passing through the mixing chamber or zone 33 and then impinge upon the plug 34 and are broken up and mixed with the entrained air. In order to facilitate such mixing and entrainment of air in the mixing chamber 33, the upper surface of the plug 34 has an annular sloping shoulder portion 38 disposed beneath the openings 30 so that the jets of liquid impinging thereon are diverted in many different directions. Preferably, the integral disk 29 and plug 34 are formed from a suitable resinous or plastic material, such as nylon, but may also be made of metal and in separate parts which may be suitably connected to form a unitary assembly.

Concentrically mounted below the baffle 25 and plug 34 and adjacent the lower or outlet end of the casing 13 is a tubular partition 39 having an outwardly turned rim 41 which seats on the inner ledges or shoulders 22 of the ribs 16 in tight frictional engagement with the lower ends of the sloping edges 21. The tubular partition 39 extends downwardly below the lower ends 19 of the ribs 16 in spaced relation from the tapering side wall of the lower end of the casing 13 to define an annular air inlet passage 42 therebetween. The lower end portion of the partition 39 has a reduced diameter portion 43 defining a shoulder 44 for supporting a screen 46. The reduced diameter portion 43 extends downwardly and terminates in axially recessed relation with respect to the lower end of the casing 13.

With the foregoing construction, water under pressure entering the upper or inlet end of the casing 13 is forced through the ring of openings 30 to provide a multiplicity of fine separate jets of water discharging downwardly into the mixing chamber 33 and toward the plug 34. Because of the discrete or relatively independent nature of the jets, the latter are entirely surrounded by air which flows upwardly into the chamber 33 through the annular opening 42 at the lower end of the casing 13 and thence through the grooves 17 and annular opening 35 into the chamber 33. As the jets of water pass through the chamber 33 to impinge against the upper surface 38 of the plug 34, air in the chamber 33 becomes entrained in the jets. The violent impingement of the jets against the surface 38 causes the latter to break up in all directions, thereby further intimately mixing the air and water within the chamber 33. A dispersed mixture of commingled air and water thus flows downwardly through the annular space 35 into the upper end of the tubular partition 39. Because of the restricted area of the space 35, the air and water mixture undergoes an increase in velocity which further contributes to the mixing action. The area of the annular space 35 is, of course, greater than the combined area of the openings 30 in the disk 29 in order to insure that the chamber 33 does not become filled with water, thereby obtaining proper operation of the device.

The intimate mixture of air and water discharging downwardly through the annular space 35 is directed by the partition 39 against the screen 46. The screen 46 retards the flow to some extent and further contributes to a coalescing of the mixture so that a nonsplashing effluent aerated stream is obtained from the fluid outlet or reduced diameter portion 43 of the partition 39. Thus, the air flowing upwardly into the inlet 42 and grooves 17 toward the chamber 33 is moving in countercurrent relation to the flow of aerated fluid passing downwardly through the reduced diameter portion 43 or fluid outlet of the device 10.

Because the annular air inlet 42 is disposed at the bottom of the aerating device 10 and adjacent the fluid outlet 43 thereof, the possibility of foreign particles being drawn into the inlet 42 is reduced. However, should contaminated or other foreign material be present on the outer surface of the casing 13, and should condensed moisture or liquid from some other source be deposited on the surface, such foreign material may possibly be carried downwardly along the outer surface of the casing and be drawn or sucked into the inlet 42 along with the inlet air.

According to the present invention, the aerator 10 includes deflecting means for preventing material, such as droplets of moisture, contaminated or otherwise, from entering the air inlet 42 and thus possibly becoming entrained in the stream of aerated fluid discharging through the outlet 43. The lower end of the casing 13 is provided with an annular outwardly extending flange 51 therearound. The upper surface, indicated at 52, of the flange 51 slopes downwardly and outwardly toward the outer edge, indicated at 53, of the flange. The flange 51 has an outer diameter substantially equal to that of the outer diameter of the casing 13 so that the perimeter of the flange edge 53 substantially coincides with the perimeter of the outer side wall of the casing 13. The lower end of the casing 13 is also recessed slightly inwardly, as at 54, and merges with the outwardly sloping surface 52 along an inwardly recessed annular juncture disposed within the projected perimeter of the outer wall of the casing 13. The lower axial end surface of the flange 51 is substantially flat, as at 56.

Thus, any droplets of moisture flowing downwardly along the outer wall of the casing 13 will follow the contours thereof and be deflected outwardly away from the annular inlet 42 by the sloping surface 52 of the flange 51, thereby preventing such material from entering the inlet 42. To further insure this result, the sloping surface 52 of the flange 51 substantially merges with the lower axial end surface 56 at the vertical edge 53. The vertical extent of the edge 53 is preferably kept to a minimum sufficient to avoid a dangerously sharp edge. This arrangement prevents a droplet from changing direction toward the inlet 42 as it flows downwardly and outwardly from the flange surface 52. The possibility of droplets being sucked into the air inlet 42 is further minimized by enlarging the terminal of the air inlet 42 by means of the outwardly tapered portion 57 thereby reducing the initial velocity of the inlet air. In addition, the slight axially upward recessing of the bottom end of the partition 39 relative to the bottom end of the casing 13, as seen in FIG. 2, further discourages inward sucking of droplets through the air inlet 42.

In FIG. 4 another aerating device 60 is illustrated which is similar to the previous embodiment in that it includes a casing 61 in which air and water mixing structure, such as that illustrated in FIG. 2, is mounted. The device 60 also includes a deflecting flange 62 around the lower end thereof for preventing entry of unwanted material into the air inlet thereof, indicated at 63, in the manner of the previous embodiment. The device 60 differs from the device 10 only in that the upper end, indicated at 64, of the casing 61 is reduced in diameter and externally threaded, as at 66, so as to permit the casing 61 to be threaded onto an appropriate internally threaded faucet or other conduit (not shown).

In FIG. 5 another aerating device 70 is illustrated which is like the device 10 in that it comprises a tubular casing 71 having a cylindrical wall 73 with air and water mixing structure therein and adapted to be threaded onto the end of an externally threaded fluid supply conduit such as the faucet 11. The device 70 also includes a deflecting flange 72 formed integrally with the casing 71 and inclined downwardly and outwardly therefrom at its lower end. The device 70 differs from the previous embodiments in that the deflecting flange 72 extends outwardly beyond the confines of the outside wall 73 of the casing 71. The aerating device 70 thus provides enhanced sanitation advantages in that the outer edge, indicated at 74, of the flange 72 is of minimum vertical extent, similar to the edge 53 of FIGS. 1 and 2, but is disposed outwardly of the air inlet to a greater extent than in the previous embodiments.

In FIG. 6, another aerating device 80 is illustrated which is identical to the aerating device 70 in all respects except as to the construction of the deflecting flange, indicated at 81, at the lower end of the casing, indicated at 82. Thus, in the aerating device 80, the deflecting flange 81 is formed from a ring of resinous or plastic material which is firmly affixed to the lower end of the metal casing 82. For example, the ring 81 may have an initial internal diameter less than the external diameter of the casing 82 so that the ring must be expanded and snugly fitted on the casing. Alternatively, the ring 81 may be permanently bonded and adhered to the metal casing. The provision of a plastic deflecting ring at the end of the aerator casing also provides a protective advantage in avoiding accidental breakage of dishes or glassware which may come in contact with the aerator.

Although the present invention has been described herein with reference to certain specific structural embodiments thereof, it will be understood that various modifications and equivalent structures may be resorted to without departing from the scope of the invention as set forth in the appended claims.

We claim:

1. In an aerating device of the type described having a tubular casing with a liquid inlet at its upper end, means within said casing providing a fluid outlet at the lower end of said casing which is spaced inwardly from said casing to define therebetween an air inlet passage having an opening at the bottom axial end of the device, and means within said casing for intimately mixing a flow of liquid from said liquid inlet with air from said air inlet passage to provide an effluent aerated stream from said fluid outlet; the improvement comprising an annular deflecting flange portion surrounding the lower end of said casing, said flange portion having a straight angular upper surface sloping downwardly and outwardly from said casing and a flat lower axial end surface, said surfaces substantially merging to define an abrupt outermost peripheral edge on said flange portion whereby fluid droplets flowing downwardly along the exterior of said casing are deflected by said flange portion away from said air inlet, and at least the bottom opening of said air inlet passage being enlarged sufficiently to maintain the inlet air velocity low enough to prevent the deflected droplets from being drawn into said air inlet passage.

2. The improvement of claim 1 further characterized in that the inner wall of said casing adjacent the lower end thereof is tapered outwardly and downwardly to said lower axial end surface whereby to provide said enlarged bottom opening.

3. The improvement of claim 1 further characterized in that said casing is metal and said flange portion comprises a ring of non-metallic resinous or plastic material secured to the exterior of said casing.

References Cited in the file of this patent

UNITED STATES PATENTS

| | | |
|---|---|---|
| 2,120,620 | Mowery | June 14, 1938 |
| 2,513,417 | Lindsay | July 4, 1950 |
| 2,761,662 | Goodrie | Sept. 4, 1956 |
| 2,889,999 | Tomlinson | June 9, 1959 |
| 2,989,249 | Richter | June 20, 1961 |
| 2,998,931 | Aghnides | Sept. 5, 1961 |